United States Patent Office 3,262,947
Patented July 26, 1966

3,262,947
2-(3-OXO-4-SUBSTITUTED-1-BUTENYL)-
5-NITROFURAN
Hiroshi Nakano, 237 Minowa, Toyonaka; Akira Sugihara, 4–161 Gamo-cho, Joto-ku, Osaka; and Masumi Ito, 201 Kodanjyutaku-40, Tonda-cho, Takatsuki, Japan
No Drawing. Filed May 3, 1965, Ser. No. 452,844
Claims priority, application Japan, May 4, 1964, 39/25,246
3 Claims. (Cl. 260—347.2)

This invention relates to new and useful 2-(3-oxo-4-substituted-1-butenyl)-5-nitrofuran.

The compounds of this invention have the following Formula I:

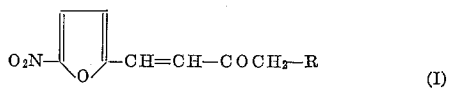
(I)

wherein R is a radical selected from the group consisting of lower aliphatic acyloxy containing from 2 to 6 carbon atoms and thiocyanato.

They may be prepared by reacting 2-(3-oxo-4-halo-1-butenyl)-5-nitrofuran (II) with a compound of the general Formula III: M–R wherein M is hydrogen, ammonium, alkali metal or alkali earth metal, and R is the same as described above.

2-(3-oxo-4-halo-1-butenyl)-5-nitrofuran (II) as a starting material can, for instance, be prepared by halogenation of 2-(3-oxo-1-butenyl)-5-nitrofuran.

In the compound (III) may be mentioned acetic acid, propionic acid, butyric acid, valeric acid or thiocyanic acid and their ammonium, alkali metal or alkali earth metal salts.

The reaction between 2-(3-oxo-4-halo-1-butenyl)-5-nitrofuran (II) and the compound (III) is usually carried out in a solvent. As the solvent is preferably used alcohol, acetone, dioxane, diethyleneglycol, etc. which are capable of dissolving and inert in the nitrofuran compound (II).

The compound (III) in liquid such as acetic acid, propionic acid, etc. may be used as the solvent, if needed. It is considered that the object compound (I) is produced by the separation hydrogen halide, alkali metal halide or alkali earth metal halide from (II) and (III) in the reaction. The reaction may be carried out in the presence of a catalyst such as guanidine or its acid salt, alkali carbonate, alkali hydrogen carbonate and so forth.

The compounds thus obtained exhibit a high order of activity against a variety of micro-organisms including both gram-positive and gram-negative bacteria and protozoa such as *Trichomonas vaginalis* or *Candida albicans*. Such activity is measured by the serial dilution commonly employed in testing antimicrobial substances. The following table shows the results of such testing of a few compounds of this invention, namely

[A]: 2-(3-oxo-4-acetoxy-1-butenyl)-5-nitrofuran;
[B]: 2-(3-oxo-4-thiocyanato-1-butenyl)-5-nitrofuran.

| Species | Minimum Inhibitory Concentration (mcg./ml.) | |
|---|---|---|
| | [A] | [B] |
| *Escherichia coli* | 20 | 5 |
| *Staphylococcus aureus* | 20 | 10 |
| *Trichomonas vaginalis* | 40 | 10 |
| *Candida albicans* | | 10 |

The following examples are given solely for the purpose of illustration only and are not to be construed as limitations of this invention, many apparent variations of which are possible without departing from the spirit or scope thereof.

*Example 1.*—*2-(3-oxo-4-acetoxy-1-butenyl)-5-nitrofuran*

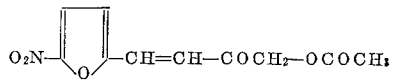

A solution of 0.25 g. of guanidine carbonate in 20 cc. of 10% acetic acid was added to a solution of 0.5 g. of 2-(3-oxo-4-bromo-1-butenyl)-5-nitrofuran in 30 cc. of acetone and warmed in water-bath at 50° C. for 1.5 hrs. The reaction solution was condensed under reduced pressure and so precipitated crystals (0.5 g.) were collected by filtration. These crystals were recrystallized from ethanol to obtain light-brown and fine scale crystals of 2-(3-oxo-4-acetoxy-1-butenyl)-5-nitrofuran having M.P. 130–131° C.

*Analysis.*—Calculated for $C_{10}H_9NO_6$: C, 50.21; H, 3.79; N, 5.86. Found: C, 50.25; H, 3.82; N, 5.95.

*Example 2.*—*2-(3-oxo-4-thiocyanato-1-butenyl)-5-nitrofuran*

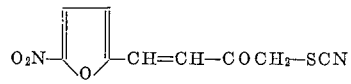

(i) A solution of 0.3 g. of potassium thiocyanate in 5 cc. of water was added to a solution of 0.8 g. of 2-(3-oxo-4-bromo-1-butenyl)-5-nitrofuran in 30 cc. of acetone and allowed to stand overnight. The reaction solution was condensed under reduced pressure. The resulting residue was added with water and filtered to obtain 0.7 g. of red-brown crystals. These crystals were purified by dissolving in acetone and adding water. Thus 2-(3-oxo-4-thiocyanato-1-butenyl)-5-nitrofuran having M.P. 118–119° C. was obtained.

Infra-red spectrum: 2150 cm.$^{-1}$ (—SCN).

*Analysis.*—Calculated for $C_9H_6N_2O_4S$: C, 45.37; H, 2.54; N, 11.76; O, 26.86. Found: C, 45.13; H, 2.79; N, 11.70; O, 26.95.

(ii) A solution of 0.3 g. of ammonium thiocyanate in 5 cc. of water was added to a solution of 1.0 g. of 2-(3-oxo-4-bromo-1-butenyl)-5-nitrofuran in 60 cc. of acetone and allowed to stand overnight. Acetone was removed from the reaction solution under reduced pressure. The resulting residue was added with water and filtered to obtain 0.9 g. of red-brown crystals. 2-(3-oxo-4-thiocyanato-1-butenyl-5-nitrofuran having M.P. 118–119° C. was obtained by purification using acetone and water.

We claim:
1. A compound having the formula

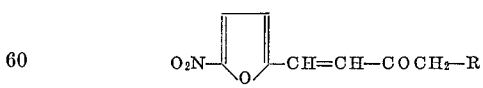

wherein R is a radical selected from the group consisting of lower alkanoyloxy containing from 2 to 6 carbon atoms and thiocyanato.

2. 2-(3-oxo-4-acetoxy-1-butenyl)-5-nitrofuran.
3. 2-(3-oxo-4-thiocyanato-1-butenyl)5-nitrofuran.

No references cited.

HENRY R. JILES, *Acting Primary Examiner.*
J. H. TURNISPEED, *Assistant Examiner.*